US010200271B2

(12) United States Patent
Han et al.

(10) Patent No.: US 10,200,271 B2
(45) Date of Patent: Feb. 5, 2019

(54) BUILDING AND TESTING COMPOSITE VIRTUAL SERVICES USING DEBUG AUTOMATION

(71) Applicant: INTERNATIONAL BUSINESS MACHINES CORPORATION, Armonk, NY (US)

(72) Inventors: Hong Liang Han, Beijing (CN); Xin Peng Liu, Beijing (CN); Bing Dong Ma, Beijing (CN); Jeremiah S. Swan, Stouffville (CA)

(73) Assignee: International Business Machines Corporation, Armonk, NY (US)

( * ) Notice: Subject to any disclaimer, the term of this patent is extended or adjusted under 35 U.S.C. 154(b) by 112 days.

(21) Appl. No.: 15/096,712

(22) Filed: Apr. 12, 2016

(65) Prior Publication Data
US 2017/0295085 A1 Oct. 12, 2017

(51) Int. Cl.
*H04L 12/26* (2006.01)
*G06F 11/36* (2006.01)

(52) U.S. Cl.
CPC .............. *H04L 43/50* (2013.01); *G06F 11/36* (2013.01); *H04L 43/12* (2013.01)

(58) Field of Classification Search
CPC ....... H04L 67/16; H04L 67/125; H04L 67/10; H04L 67/42; H04L 43/50; H04L 43/12; G06Q 10/06
USPC ................................................ 709/203, 235
See application file for complete search history.

(56) References Cited

U.S. PATENT DOCUMENTS

| 6,701,514 B1* | 3/2004 | Haswell ............. G06F 11/3664 707/999.102 |
| 7,506,047 B2 | 3/2009 | Wiles, Jr. |
| 7,721,265 B1* | 5/2010 | Xu ...................... G06F 11/3664 714/31 |

(Continued)

FOREIGN PATENT DOCUMENTS

EP 2107712 A1 10/2009

OTHER PUBLICATIONS

Apiary, "Fast-track your API Design," Apiary—How It Works, p. 1-4, Apiary Inc., https://apiary.io/how-it-works, Accessed on Jan. 18, 2016.

(Continued)

*Primary Examiner* — David R Lazaro
*Assistant Examiner* — Berhanu Shitayewoldetadik
(74) *Attorney, Agent, or Firm* — Robert C. Bunker

(57) ABSTRACT

A method for testing a composite service is provided. The method may include installing a first debug probe on a first service. The method may include installing a second debug probe on a second service. The method may include executing the composite service, whereby the composite service comprises the first service and the second service. The method may include receiving a first service interaction log and a second service interaction log, whereby the first interaction log records a first plurality of I/O, and whereby the second interaction log records a second plurality of I/O. The method may include generating a global scheduling script based on the first service interaction log and the second interaction log. The method may include sending the first plurality of I/O to the first debug probe and the second plurality of I/O to the second debug probe based on the global scheduling script.

17 Claims, 7 Drawing Sheets

(56) References Cited

U.S. PATENT DOCUMENTS

| | | | |
|---|---|---|---|
| 8,112,262 B1 | 2/2012 | Michelsen | |
| 8,418,000 B1 | 4/2013 | Salame | |
| 8,566,796 B2 | 10/2013 | Cates | |
| 8,769,101 B2* | 7/2014 | Xu | G06F 9/5055 705/7.26 |
| 8,886,571 B2 | 11/2014 | Mannava et al. | |
| 9,335,803 B2* | 5/2016 | Wang | G06F 1/26 |
| 9,794,160 B1* | 10/2017 | Felstaine | H04L 43/50 |
| 9,898,384 B2 | 2/2018 | Chan et al. | |
| 2002/0083213 A1* | 6/2002 | Oberstein | G06F 11/3684 719/313 |
| 2004/0205187 A1* | 10/2004 | Sayal | H04L 67/02 709/224 |
| 2005/0193269 A1* | 9/2005 | Haswell | G06F 11/3684 714/38.13 |
| 2006/0129885 A1* | 6/2006 | Bozak | G06F 11/3476 714/15 |
| 2007/0076616 A1* | 4/2007 | Ngo | H04L 12/2697 370/241 |
| 2007/0083813 A1* | 4/2007 | Lui | G06F 11/3612 715/709 |
| 2008/0109681 A1* | 5/2008 | De Pauw | G06F 11/3688 714/38.14 |
| 2008/0120129 A1* | 5/2008 | Seubert | G06Q 10/06 705/35 |
| 2009/0165021 A1* | 6/2009 | Pinkston | G06F 9/546 719/314 |
| 2010/0153787 A1* | 6/2010 | Beattie, Jr. | H04L 41/0681 714/43 |
| 2013/0290239 A1* | 10/2013 | Vaquero | G06N 5/025 706/47 |
| 2013/0339934 A1 | 12/2013 | Troch et al. | |
| 2014/0207942 A1* | 7/2014 | Kamble | H04L 41/18 709/224 |
| 2014/0359472 A1* | 12/2014 | Lefor | H04M 1/72569 715/746 |
| 2015/0205701 A1 | 7/2015 | Michelsen | |
| 2015/0220423 A1* | 8/2015 | Kraus | G06F 11/3684 717/135 |
| 2015/0382212 A1* | 12/2015 | Elliott | H04W 76/10 370/252 |
| 2016/0026558 A1 | 1/2016 | Krishnan et al. | |

OTHER PUBLICATIONS

Chan et al., "Automated Problem Determination for Cooperating Web Services Using Debugging Technology," Application and Drawings, filed Mar. 18, 2016, p. 1-33, U.S. Appl. No. 15/074,249.

Mell et al., "The NIST Definition of Cloud Computing," National Institute of Standards and Technology, Sep. 2011, p. 1-3, Special Publication 800-145.

Morris et al., "Testing in Service-Oriented Environments," Research, Technology, and System Solutions (RTSS) Program Technical Report, Mar. 2010, p. 1-68, Carnegie Mellon University, Software Engineering Institute.

Ren, "Dynamic Self-Healing for Composite Services using Semantic Web Service Technology," Griffith University Thesis, Jul. 2009, p. 1-221, School of Information and Communication Technology.

Runscope, "Build Better APIs, Together," Runscope API Monitoring and Testing, p. 1-4, Runscope Inc., https://www.runscope.com/, Accessed on Jan. 18, 2016.

Wu et al., "Heterogeneous Grid Workflow Management Based on Virtual Service," Seventh International Conference on Grid and Cooperative Computing, 2008, p. 483-489, IEEE Computer Society.

* cited by examiner

BUILDING AND TESTING COMPOSITE VIRTUAL SERVICES USING DEBUG AUTOMATION

BACKGROUND

The present invention relates generally to the field of computing, and more particularly to software testing.

Test virtualization is becoming an important technology for improving application lifecycle management by performing integration testing earlier in the application lifecycle for complex distributed systems. In modern applications, cooperation between multiple services is often integral to the design of the application.

SUMMARY

According to one exemplary embodiment, a method for testing a composite service is provided. The method may include installing a first debug probe on a first service. The method may also include installing a second debug probe on a second service. The method may then include executing the composite service, whereby the executed composite service comprises the first service and the second service. The method may further include receiving a first service interaction log and a second service interaction log based on the executed composite service, whereby the first interaction log records a first plurality of input/output (I/O) associated with the first service, and whereby the second interaction log records a second plurality of I/O associated with the second service. The method may also include generating a global scheduling script that simulates the composite service based on the received first service interaction log and the received second interaction log. The method may then include sending the first plurality of I/O to the first debug probe and the second plurality of I/O to the second debug probe based on the generated global scheduling script.

According to another exemplary embodiment, a computer system for testing a composite service is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include installing a first debug probe on a first service. The method may also include installing a second debug probe on a second service. The method may then include executing the composite service, whereby the executed composite service comprises the first service and the second service. The method may further include receiving a first service interaction log and a second service interaction log based on the executed composite service, whereby the first interaction log records a first plurality of input/output (I/O) associated with the first service, and whereby the second interaction log records a second plurality of I/O associated with the second service. The method may also include generating a global scheduling script that simulates the composite service based on the received first service interaction log and the received second interaction log. The method may then include sending the first plurality of I/O to the first debug probe and the second plurality of I/O to the second debug probe based on the generated global scheduling script.

According to yet another exemplary embodiment, a computer program product for testing a composite service is provided. The computer program product may include one or more computer-readable storage devices and program instructions stored on at least one of the one or more tangible storage devices, the program instructions executable by a processor. The computer program product may include program instructions to install a first debug probe on a first service. The computer program product may also include program instructions to install a second debug probe on a second service. The computer program product may then include program instructions to execute the composite service, whereby the executed composite service comprises the first service and the second service. The computer program product may further include program instructions to receive a first service interaction log and a second service interaction log based on the executed composite service, whereby the first interaction log records a first plurality of input/output (I/O) associated with the first service, and whereby the second interaction log records a second plurality of I/O associated with the second service. The computer program product may also include program instructions to generate a global scheduling script that simulates the composite service based on the received first service interaction log and the received second interaction log. The computer program product may then include program instructions to send the first plurality of I/O to the first debug probe and the second plurality of I/O to the second debug probe based on the generated global scheduling script.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
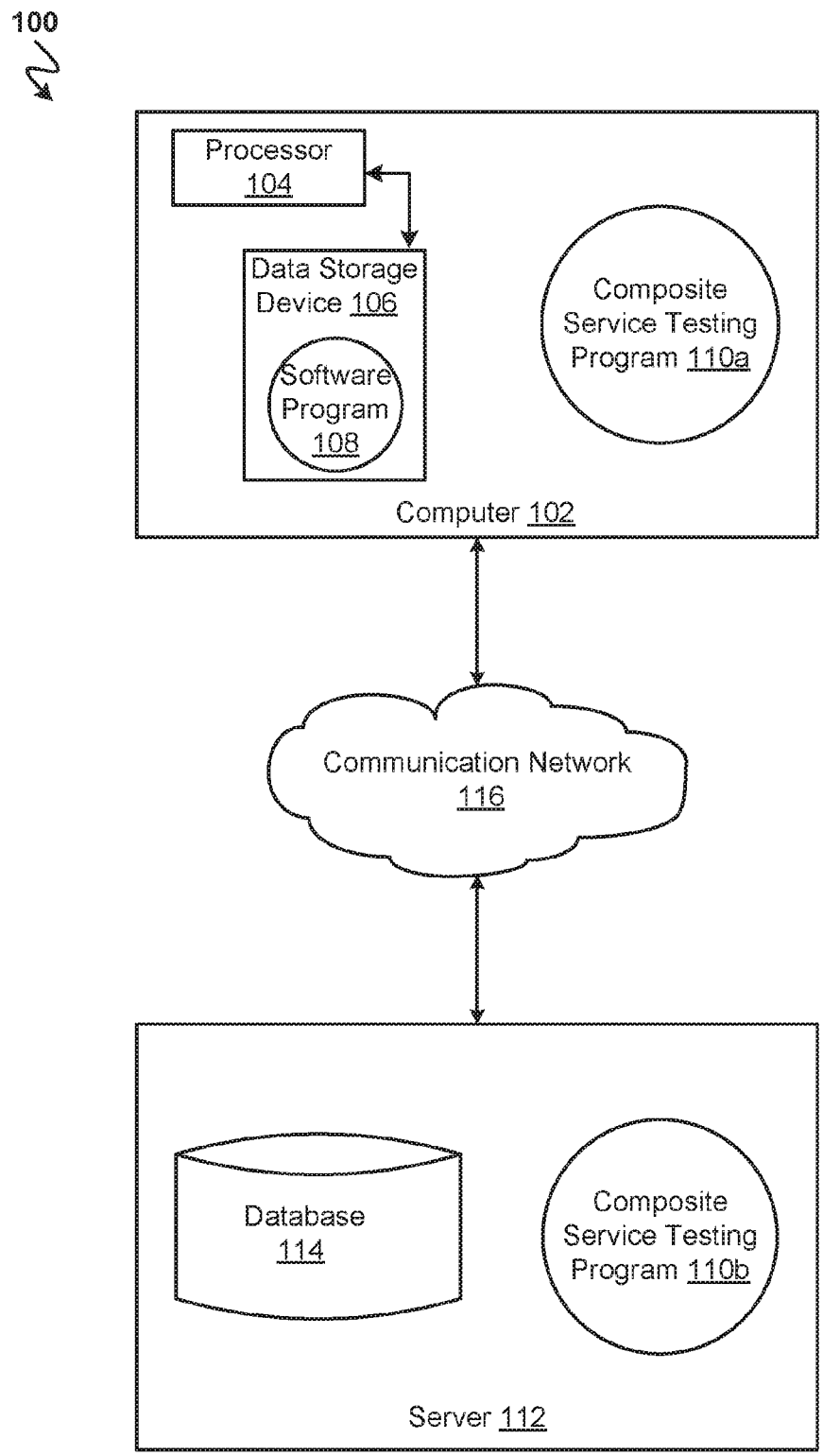
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product for composite service testing. As such, the present embodiment has the capacity to improve the technical field of software testing by building and testing composite services using debug automation technology. More specifically, a debug probe may be installed on each service node that may record data relating to the service. Then, a composite service may be run and recordings from the debug probes installed in the member service nodes may be collected. The collected recordings may then be used to generate a global scheduling script incorporating the recordings from each debug probe. Thereafter, the global scheduling script may be deployed to a central node running a debugger engine, whereby each service or service stub on the service node may be executed according to the global scheduling script to simulate the composite service for use in testing.

As described previously, test virtualization is becoming an important technology for improving application lifecycle management by performing integration testing earlier in the application lifecycle for complex distributed systems. In modern applications, cooperation between multiple services is often integral to the design of the application. In order to adequately test an application, a group of service interactions may need to be simulated. Delaying integration testing until all of the component services and/or the composite service have been completed may slow application development significantly. Available tools may simulate a singleton service. However these tools may not simulate a composite service that may use multiple singleton services. Therefore, it may be advantageous to, among other things, provide a way to simulate a composite service made of multiple singleton services to allow integration testing earlier in application development.

According to at least one embodiment, composite service virtualization may proceed using a recording phase followed by a simulation phase. At the start of the recording phase, a debug probe may be installed on each member service of the composite service. The debug probes may be used to record input and output (I/O) to and from the service the debug probe is recording. Recordings made by the individual debug probes may be collected by a composite service script generator. The composite service script generator may then use the collected probe recordings to generate a scheduling script that combines the individual probe recordings using known sequence analysis techniques. Once the recording phase completes, the simulation phase may begin based on the generated scheduling script.

The simulation phase may begin by sending the generated scheduling script to a debugger engine executing on a central node. Based on the data collected during the recording phase, stub services (i.e., virtual service that may not be fully implemented yet mimics the full service using the previously recorded I/O) may be created. The debug probes may also be assigned to the stub services corresponding to the service the debug probe originally recorded. After starting each member service or stub service, an initial request (i.e., input) may be sent to a composite service stub corresponding to the composite service under test. To execute the composite service test, the debugger engine may start the member services or stub services according to the scheduling script. When the member services begin or end execution, the member service (or service stub) may communicate to the central node running the debugger engine. Thereafter, the debugger engine may determine the next interaction that may occur (e.g., which service stub will execute next and with what data as an input). After the debug probe sends the recorded input to the service or service stub, the debug probe may then obtain a reply (i.e., output).

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a composite service testing program 110a. The networked computer environment 100 may also include a server 112 that is enabled to run a composite service testing program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 5, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the composite service testing program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the composite service testing program 110a, 110b (respectively) to allow a user to record component service interaction within a composite service, generate a global scheduling script, and run the global scheduling script to simulate the composite service for testing. The composite service testing method is explained in more detail below with respect to FIGS. 2-4.

Figure 2:
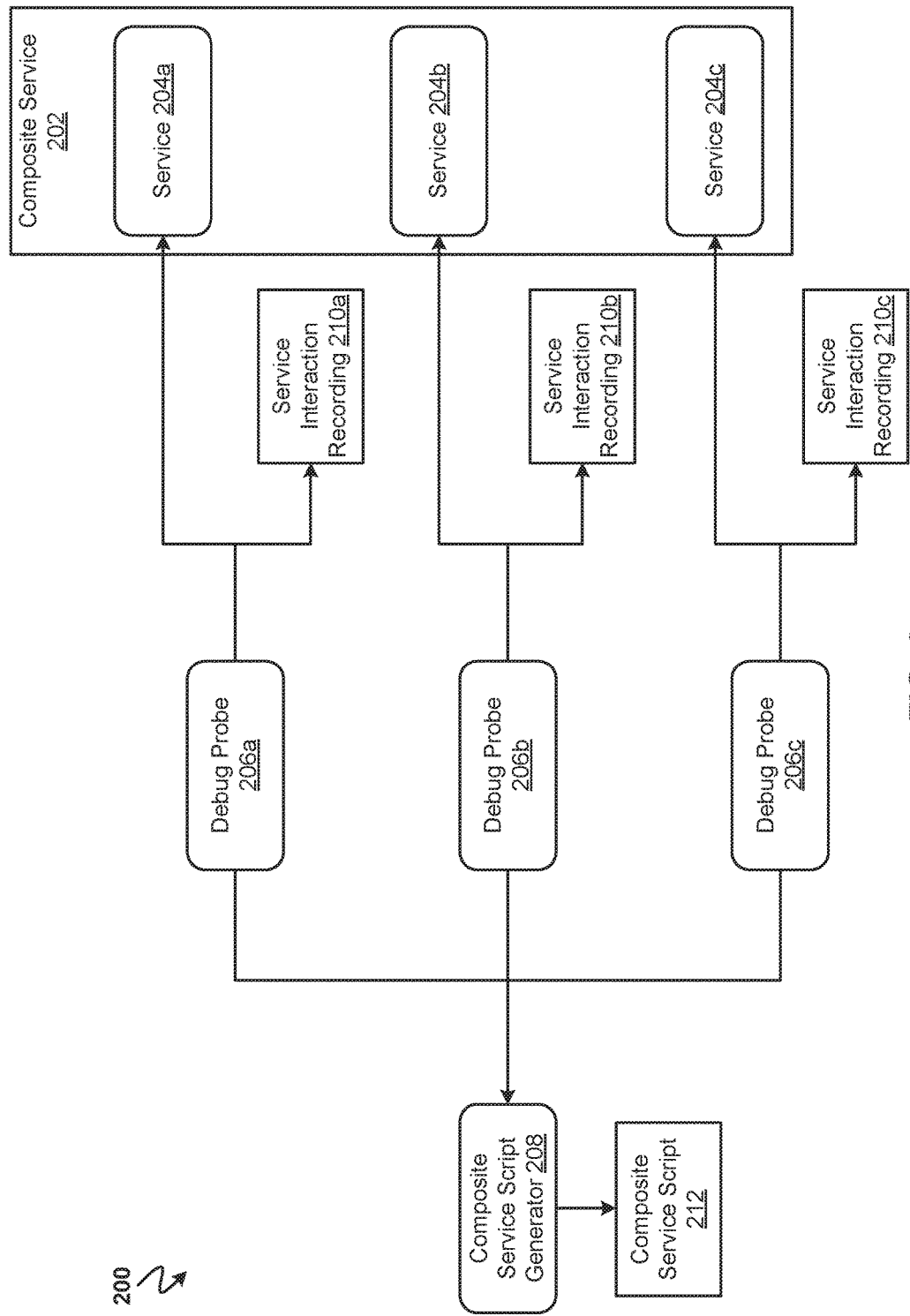
FIG. 2 is a block diagram of a composite service testing environment according to at least one embodiment.

Referring now to FIG. 2, a block diagram of a composite service testing environment 200 according to at least one embodiment is depicted. The composite service testing environment may include a composite service 202 consisting of multiple member services 204a-c with a debug probe 206a-c installed on each service 204a-c. Additionally, the debug probes 206*a-c* may be implemented as a script and may be communicatively coupled (e.g., via communication network 116 (FIG. 1)) with a composite service script generator 208. According to at least one embodiment, the composite service script generator 208 may be located on the central node and furthermore may be part of the debugger engine. Each debug probe 206*a-c* may record input and output (I/O) received and sent by the service 204*a-c* as service interaction recordings 210*a-c* that will be described in detail below with respect to FIG. 3. The composite service script generator 208 may then collect the service interaction recordings 210*a-c* from the debug probes 206*a-c* to create a composite service script 212 as will be described in detail below with respect to FIG. 3.

Figure 3:
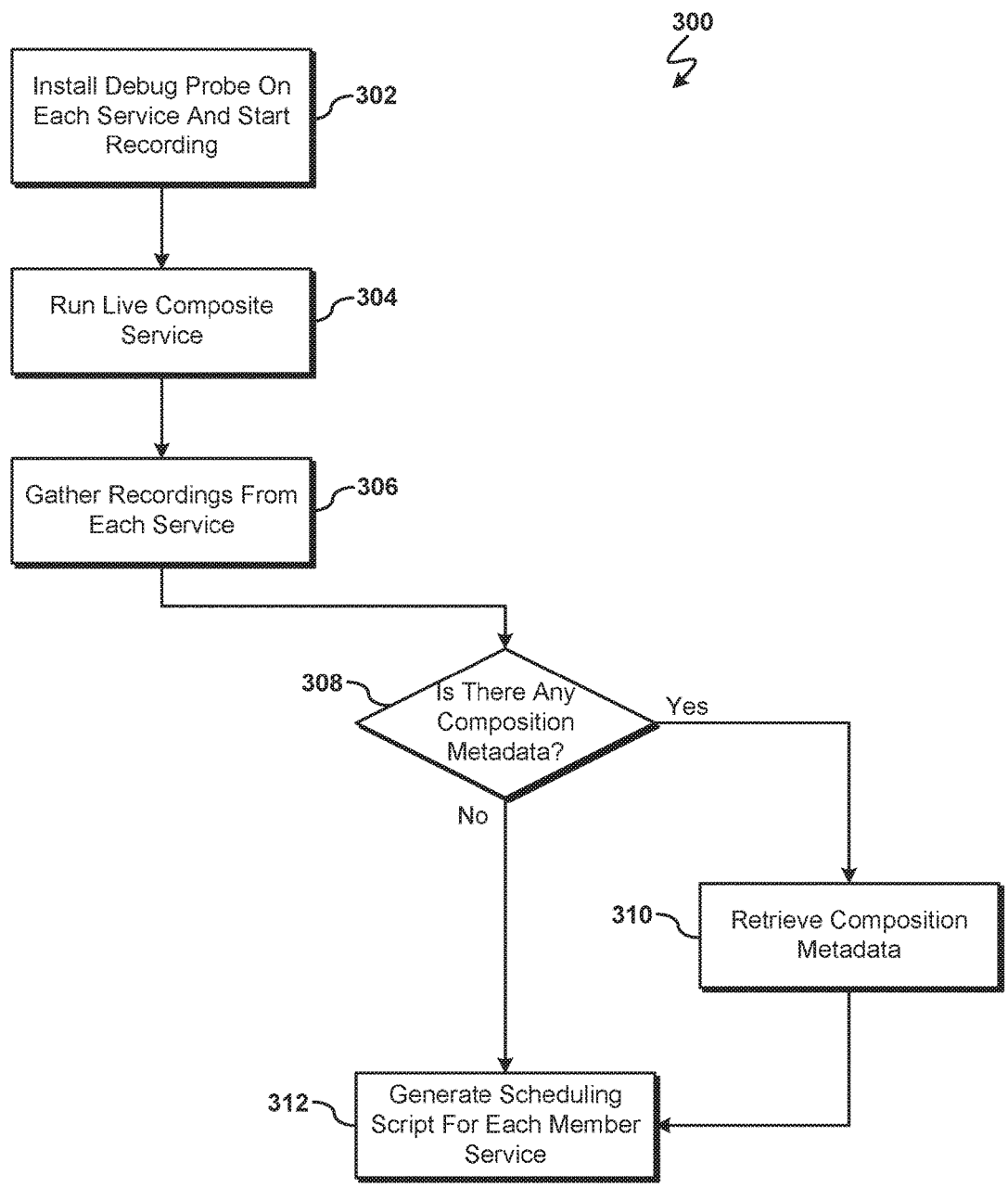
FIG. 3 is an operational flowchart illustrating a process for composite service recording according to at least one embodiment.

Referring now to FIG. 3, an operational flowchart illustrating the exemplary composite service recording process 300 (i.e., recording phase) used by the composite service testing program 110*a* and 110*b* (FIG. 1) according to at least one embodiment is depicted.

At 302, a debug probe 206*a-c* (FIG. 2) is installed on each service 204*a-c* (FIG. 2) within the composite service 202 (FIG. 2) and instructed to start recording. According to at least one embodiment, the debug probes 206*a-c* (FIG. 2) may be implemented as a script that records copies of data received by the service 204*a-c* (FIG. 2) as input as well as data sent out as output when the debug probe 206*a-c* (FIG. 2) is started in record mode. The debug probe 206*a-c* (FIG. 2) may save the copied data in memory or to a data storage device 106 (FIG. 1) as part of a service interaction recording 210*a-c* (FIG. 2). Additionally, the debug probe 206*a-c* (FIG. 2) may save a timestamp associated with each data transmission (e.g., at time $T_1$ input data $D_1$ was received by service 204*a* (FIG. 2) from service 204*c* (FIG. 2)).

Next, at 304, the composite service 202 (FIG. 2) is run. According to at least one embodiment, the composite service 202 (FIG. 2) may be initiated and run by a request, a function/system call, or some other method. Once the composite service 202 (FIG. 2) is run, the member services 204*a-c* (FIG. 2) may communicate via data transmissions (e.g., using communication network 116 (FIG. 1)) with each other while the debug probes 206*a-c* (FIG. 2) record copies of the data transmissions with timestamps in service interaction recordings 210*a-c* (FIG. 2).

For example, composite service 202 (FIG. 2) may be run by sending a service request to the composite service 202 (FIG. 2). The composite service 202 (FIG. 2) may begin by sending data $D_1$ to service 204*b* (FIG. 2) at time $T_0$. Debug probe 206*b* (FIG. 2) installed on service 204*b* (FIG. 2) may record a copy of data $D_1$ sent to service 204*b* (FIG. 2) with a timestamp indicating when the data was sent (i.e., $T_0$) into a service interaction recording 210*b* (FIG. 2) stored in a data storage device 106 (FIG. 1). Thereafter, as part of the composite service 202 (FIG. 2), service 204*b* (FIG. 2) may send data $D_2$ to service 204*c* (FIG. 2) as output at time $T_1$. Debug probe 206*b* (FIG. 2) may also record data $D_2$ sent out from service 204*b* (FIG. 2) with a timestamp corresponding to time $T_1$ in service interaction recording 210*b* (FIG. 2). As service 204*c* (FIG. 2) receives the data $D_2$ sent from service 204*b* (FIG. 2), the debug probe 206*c* (FIG. 2) installed on service 204*c* (FIG. 2) may record a copy of data $D_2$ sent to service 204*c* (FIG. 2) with a timestamp indicating when the data set was sent (i.e., $T_1$) into a service interaction recording 210*c* (FIG. 2) stored in a data storage device 106 (FIG. 1). Next, service 204*c* (FIG. 2) may process the received data $D_2$ and, at time $T_2$, send out data $D_3$ to service 204*a* (FIG. 2) and data $D_4$ to service 204*b* (FIG. 2). Debug probe 206*c* (FIG. 2) may then record data $D_3$ and data $D_4$ in the service interaction recording 210*c* (FIG. 2) along with timestamp $T_2$ as output from service 204*c* (FIG. 2). Debug probe 206*a* (FIG. 2) may then record data $D_3$ as input with timestamp $T_2$ in service interaction recoding 210*a* (FIG. 2) and debug probe 206*b* (FIG. 2) may record data $D_4$ as input with timestamp $T_2$ in service interaction recording 210*b* (FIG. 2). Finally, service 204*a* (FIG. 2) may output data $D_5$ at time $T_3$ and service 204*b* (FIG. 2) may output data $D_6$ also at time $T_3$. Thereafter, debug probe 206*a* (FIG. 2) may record data $D_5$ and timestamp $T_3$ in service interaction recording 210*a* (FIG. 2) and debug probe 206*b* (FIG. 2) may record data $D_6$ and timestamp $T_3$ in service interaction recording 210*b* (FIG. 2). Data $D_5$ and $D_6$ may then be used as the final output from the composite service 202 (FIG. 2) and thereafter the composite service 202 (FIG. 2) may end.

Then, at 306, the service interaction recordings 210*a-c* (FIG. 2) are gathered from each service 204*a-c* (FIG. 2). According to at least one embodiment, when the composite service 202 (FIG. 2) has finished execution, the composite service script generator 208 (FIG. 2) may access and retrieve the service interaction recordings 210*a-c* (FIG. 2). The composite service script generator 208 (FIG. 2) may access the service interaction recordings 210*a-c* (FIG. 2) by locating the service interaction recordings 210*a-c* (FIG. 2) in a predetermined location (e.g., data storage device 106 (FIG. 1)), by querying the debug probes 206*a-c* (FIG. 2), or by some other method. According to at least one other embodiment, the debug probes 206*a-c* (FIG. 2) may send the service interaction recordings 210*a-c* (FIG. 2) at a predetermined time (e.g., when the service 204*a-c* (FIG. 2) finishes execution).

At 308, the composite service recording process 300 may determine if there is any composition metadata associated with the member services 204*a-c* (FIG. 2) of the composite service 202 (FIG. 2). According to at least one embodiment, the member services 204*a-c* (FIG. 2) may be described by a Business Process Modeling (BPM) language (e.g., Business Process Model and Notation (BPMN), or Business Process Execution Language (BPEL), etc.) and an indication of the language architecture (e.g., BMPN) may be included in an application package that may be known before simulation begins. Alternatively, a user may input an indicator to the composite service recording process 300 signaling that the member service(s) 204*a-c* (FIG. 2) has composition metadata available. According to at least one other embodiment, the composite service recording process 300 may analyze the member services 204*a-c* (FIG. 2) using known methods to determine if the member services 204*a-c* (FIG. 2) are described by a BPM language or other implementation having composition metadata.

If the composite service recording process 300 determined that there is composition metadata associated with the composite service 202 (FIG. 2) at 308, then the composition metadata is retrieved by the composite service script generator 208 (FIG. 2) at 310. According to at least one embodiment, the composite service script generator 208 (FIG. 2) may retrieve composition metadata associated with the composite service 202 (FIG. 2) by leveraging the BPM language architecture to find metadata at locations determined by the composite service script generator 208 (FIG. 2). The composition metadata may include information describing how the services 204*a-c* (FIG. 2) are organized at runtime, such as whether services 204*a-c* (FIG. 2) run in sequence, in parallel, or conditionally. Furthermore, the composition metadata may include guard events, issue events, or other data. Guard events may specify perquisite events that may need to occur before a service 204*a-c* (FIG.

2) may be run (e.g., service 204a (FIG. 2) only executes after services 204b and 204c (FIG. 2) produce a result). Issue events may specify an event that a service (e.g., 204a (FIG. 2)) may generate (e.g., after execution) to inform other services (e.g., 204b and 204c (FIG. 2)) that the specified event occurred and the issue event may be used by the other services (e.g., 204b and 204c (FIG. 2)) to determine if a guard event was satisfied. From the composition metadata, the composite service script generator 208 (FIG. 2) may determine how the member services 204a-c (FIG. 2) of the composite service 202 (FIG. 2) are used, in what order the member services 204a-c (FIG. 2) are used, and how the member services 204a-c (FIG. 2) interact with each other.

However, if the composite service recording process 300 determined that there is no composition metadata associated with the composite service 202 (FIG. 2) at 308, or if composition metadata was retrieved at 310, then the composite service script generator 208 (FIG. 2) generates a scheduling script for each member service 204a-c (FIG. 2) at 312. According to at least one embodiment, the composite service script generator 208 (FIG. 2) may build a final composite service script 212 (FIG. 2) (i.e., global scheduling script) based on the I/O data recorded in the service interaction recordings 210a-c (FIG. 2) and additionally use the recorded timestamps if no composition metadata is available. If metadata was retrieved at 310, then the composite service script generator 208 (FIG. 2) may use the metadata in lieu of the timestamps to generate the composite service script 212 (FIG. 2). Furthermore, the composite service script generator 208 (FIG. 2) may use known sequential analysis methods to generate the composite service script 212 (FIG. 2) based on the available data collected previously (e.g., I/O, timestamps, metadata, etc.). The composite service script 212 (FIG. 2) may include information detailing the sequence services 204a-c (FIG. 2) may be executed, which services 204a-c (FIG. 2) may execute in parallel, or what conditions (e.g., guard events) may be met before a service runs.

According to at least one embodiment, the generated global scheduling script may also be editable by a tester to change guard event(s), issue event(s), and/or service 204a-c (FIG. 1) sequences, etc., if the tester desires to change the interaction behavior. Thus, the scheduling script may be altered from strict recordings of the interactions of the services 204a-c (FIG. 1) by tester(s) to achieve different testing environments.

Figure 4:
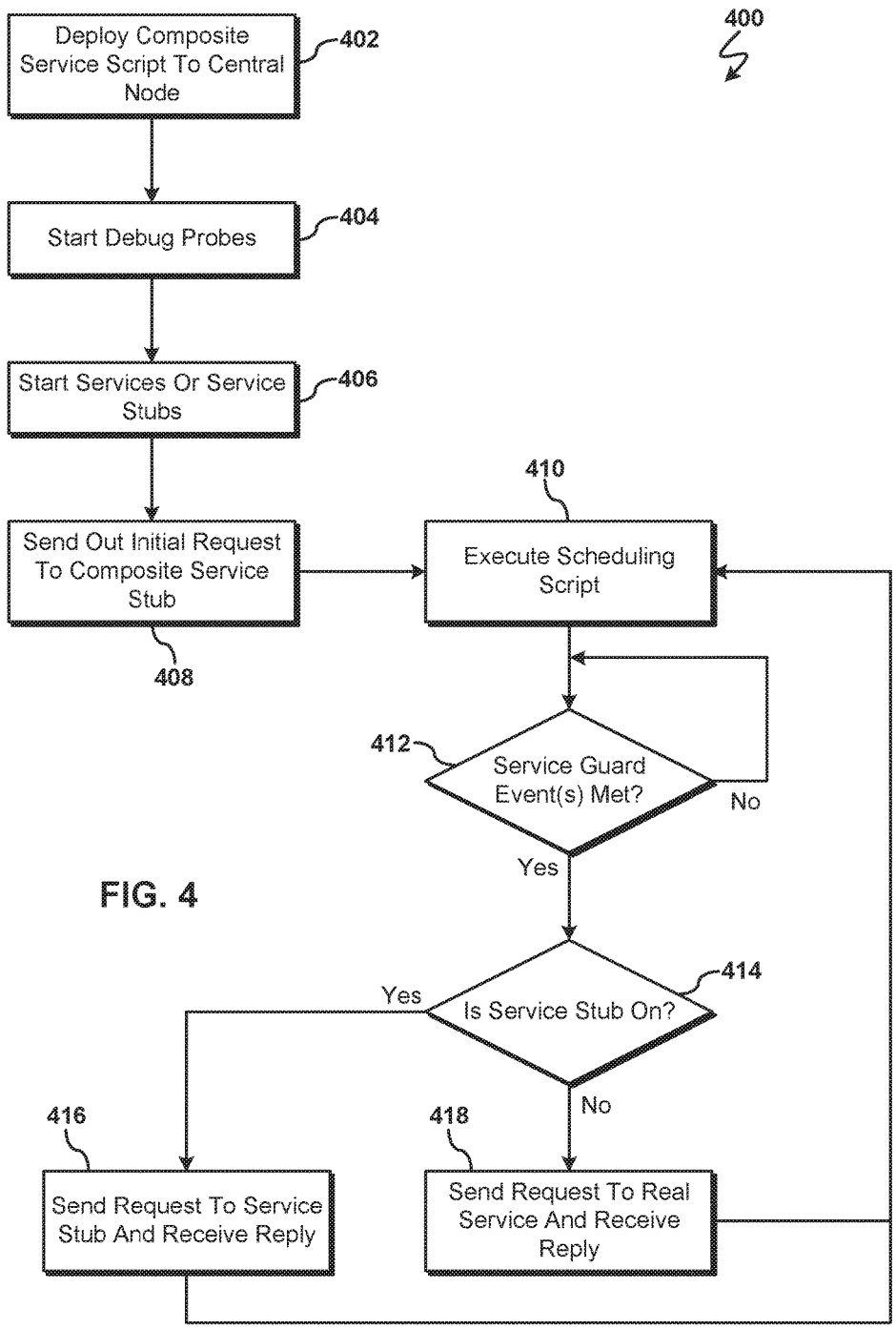
FIG. 4 is an operational flowchart illustrating a process for composite service simulation according to at least one embodiment.

Referring now to FIG. 4, an operational flowchart illustrating the exemplary composite service simulation process 400 (i.e., simulation phase) used by the composite service testing program 110a and 110b (FIG. 1) according to at least one embodiment is depicted.

At 402, the composite service script (i.e., global scheduling script) is deployed to a central node. According to at least one embodiment, the global scheduling script determined previously at 312 (FIG. 3) is sent to a central node running a debugger engine. The scheduling script may be sent to the central node via a communication network 116 (FIG. 1) from the composite service script generator 208 (FIG. 2) to the central node if the composite service script generator 208 (FIG. 2) is not located on the central node.

Next, at 404, the debug probes 206a-c (FIG. 2) are started in simulation mode. According to at least one embodiment, the debug probes 206a-c (FIG. 2) may be instructed to start in simulation mode by the composite service simulation process 400 or automatically upon receipt of the scheduling scripts described previously at 402, etc. The debug probes 206a-c (FIG. 2) may interact with the full member services 204a-c (FIG. 2) or service stubs (i.e., placeholders for services 204a-c (FIG. 2) that mimic or simulate the behavior of the full member service 204a-c (FIG. 2) based on the scheduling script) for composite service 202 (FIG. 2) testing. In simulation mode, the debug probes 206a-c (FIG. 2) may change from recording logic (used previously in FIG. 3) to simulation logic, whereby the debug probes 206a-c (FIG. 2) send member services 204a-c (FIG. 2) or service stubs input and obtain replies as will be described in further detail below.

Then, at 406, the member services 204a-c (FIG. 2), or service stubs corresponding to the member services 204a-c (FIG. 2), are started. According to at least one embodiment, the member services 204a-c (FIG. 2) or service stubs used by the composite service 202 (FIG. 2) may be started fully or partially with enough functionality to test the composite service 202 (FIG. 2). Member services 204a-c (FIG. 2) or stub services may be started by system/function calls or other methods required by the service 204a-c (FIG. 2) architecture.

At 408, an initial request is sent out to a composite service stub representing the composite service 202 (FIG. 2) under test. According to at least one embodiment, the composite service stub representing the composite service 202 (FIG. 2) may be invoked by sending a request or other initiation event based on the design of the composite service 202 (FIG. 2). For example, the design of the composite service 202 (FIG. 2) may dictate that a request, along with multiple arguments, be passed to the composite service 202 (FIG. 2) to initiate the composite service 202 (FIG. 2). Therefore, the request and necessary arguments may be passed to the composite service stub to initiate composite service 202 (FIG. 2) testing.

Next, at 410, the central debugging engine executes the scheduling script. According to at least one embodiment, the debugging engine running on the central node may begin executing the scheduling script received previously at 402. As the debugging engine executes the scheduling script, the debugging engine may send commands to the debug probes 206a-c (FIG. 2) associated with the service nodes (i.e., nodes that include a service 204a-c (FIG. 2) and/or a service stub) for the debug probe 206a-c (FIG. 2) to begin a service 204a-c (FIG. 2) or service stub and provide input for the service 204a-c (FIG. 2) or service stub. For example, the debugging engine may execute the scheduling script, and the scheduling script may indicate that service 204a (FIG. 2) or a service stub representing service 204a (FIG. 2) will be run next in sequence to simulate the composite service 202 (FIG. 2).

Then, at 412, the debug probe 206a-c (FIG. 2) determines if the service guard event(s) has been met. As described previously, guard events may indicate certain events that must occur before the member service 204a-c (FIG. 2) may begin execution. For example, service 204a (FIG. 2) may require service 204b (FIG. 2) to process a data set and output the processed data set as a database (e.g., 114 (FIG. 1)) that service 204a (FIG. 2) will use as initial input to process before service 204a (FIG. 2) may begin execution. According to at least one embodiment, the debug probe 206a-c (FIG. 2) may determine if the member service 204a-c (FIG. 2) or stub service has any guard events and if those guard events have occurred. Guard events may have been determined previously from composition metadata at 310 (FIG. 3) or a guard event may be derived based on the timestamps and attendant I/O data recorded in the service interaction recordings 210a-c (FIG. 2) indicating certain data arrives at a member service 204a-c (FIG. 2) at a specific time (i.e., according to the timestamp) before the member service 204*a-c* (FIG. 2) begins execution. Guard events may be indicated in the global scheduling script received by the central node previously at 402. If the debug probe 206*a-c* (FIG. 2) determined that the guard event(s) were not met at 412, then the debug probe 206*a-c* (FIG. 2) may continue to check for the guard event(s) until the guard event(s) occur before proceeding.

However, if the debug probe 206*a-c* (FIG. 2) determined that the guard event(s) were met at 412, then the debug probe 206*a-c* (FIG. 2) determines if the service stub is on at 414. According to at least one embodiment, the debug probe 206*a-c* (FIG. 2) may query a service stub to determine if the service stub is present and available. According to at least one other embodiment, flags indicating if service stubs are on may be stored in a service registry data structure, such as an array, that the debug probe 206*a-c* (FIG. 2) may search to determine if a specific service stub is on.

If the debug probe 206*a-c* (FIG. 2) determines that the service stub is on at 414, then the debug probe 206*a-c* (FIG. 2) may send a request to the service stub and receive a reply at 416. According to at least one embodiment, the debug probe 206*a-c* (FIG. 2) may send a request to the service stub in accordance with the scheduling script to mimic the behavior of the composite service 202 (FIG. 2). Thereafter, the service stub may send a reply to the debug probe 206*a-c* (FIG. 2). After the debug probe 206*a-c* (FIG. 2) receives the reply, the debug probe 206*a-c* (FIG. 2) may send a signal or other communication (e.g., via communication network 116 (FIG. 1)) to the debugger engine on the central node indicating the service stub has completed. Then, the composite service simulation process 400 may return to 410 to execute the scheduling script for the next debug probe 206*a-c* (FIG. 2). Once the composite service stub has finished running and the service nodes have run in proper sequence, the composite service simulation process 400 may end.

However, if the debug probe 206*a-c* (FIG. 2) determines that the service stub is not on at 414, then the debug probe 206*a-c* (FIG. 2) may send a request to the real member service 204*a-c* (FIG. 2) and receive a reply at 418. According to at least one embodiment, the debug probe 206*a-c* (FIG. 2) may send a request to the member service 204*a-c* (FIG. 2) in accordance with the scheduling script to mimic the behavior of the composite service 202 (FIG. 2). Thereafter, the member service 204*a-c* (FIG. 2) may send a reply to the debug probe 206*a-c* (FIG. 2). After the debug probe 206*a-c* (FIG. 2) receives the reply, the debug probe 206*a-c* (FIG. 2) may send a signal or other communication (e.g., via communication network 116 (FIG. 1)) to the debugger engine on the central node indicating the member service 204*a-c* (FIG. 2) has completed. Then, the composite service simulation process 400 may return to 410 to execute the scheduling script for the next debug probe 206*a-c* (FIG. 2). Once the composite service stub has finished running and the service nodes have run in proper sequence, the composite service simulation process 400 may end.

It may be appreciated that FIGS. 2-4 provide only an illustration of one embodiment and do not imply any limitations with regard to how different embodiments may be implemented. Many modifications to the depicted embodiment(s) may be made based on design and implementation requirements. For example, when the recording phase executes as described previously with respect to FIG. 3, nested composite service construction may also be supported. As such, each composite service stub may in turn be regarded as a singleton service stub to form services with coarser granularity. According to at least one exemplary scenario, two or more composite services 202 (FIG. 2), each made up of multiple services 204*a-c* (FIG. 2), may be children of a parent composite service. Thus, to test the parent composite service, the two or more composite services 202 (FIG. 2) used as children by the parent composite service may be treated in the recording phase (i.e., FIG. 3) and the testing phase (i.e., FIG. 4) as singleton services 204*a-c* (FIG. 2).

Figure 5:
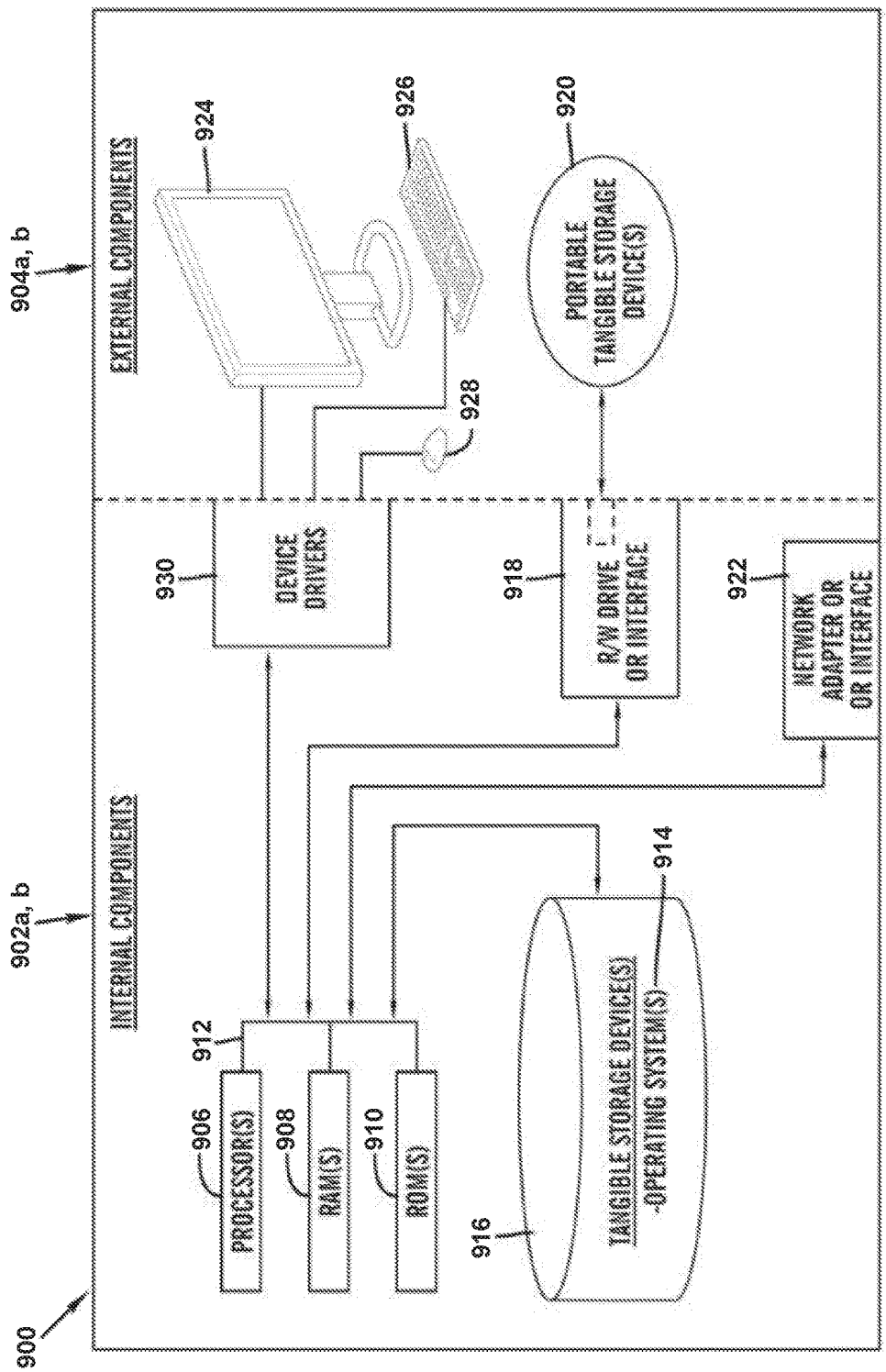
FIG. 5 is a block diagram of internal and external components of computers and servers depicted in FIG. 1 according to at least one embodiment.

FIG. 5 is a block diagram 900 of internal and external components of computers depicted in FIG. 1 in accordance with an illustrative embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server 112 (FIG. 1) may include respective sets of internal components 902 *a, b* and external components 904*a, b* illustrated in FIG. 5. Each of the sets of internal components 902*a, b* includes one or more processors 906, one or more computer-readable RAMs 908, and one or more computer-readable ROMs 910 on one or more buses 912, and one or more operating systems 914 and one or more computer-readable tangible storage devices 916. The one or more operating systems 914 and the software program 108 (FIG. 1) and the composite service testing program 110*a* (FIG. 1) in client computer 102 (FIG. 1) and the composite service testing program 110*b* (FIG. 1) in network server 112 (FIG. 1), may be stored on one or more computer-readable tangible storage devices 916 for execution by one or more processors 906 via one or more RAMs 908 (which typically include cache memory). In the embodiment illustrated in FIG. 5, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902*a, b* also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 (FIG. 1) and the composite service testing program 110*a* and 110*b* (FIG. 1) can be stored on one or more of the respective portable computer-readable tangible storage devices 920, read via the respective R/W drive or interface 918, and loaded into the respective hard drive 916.

Each set of internal components 902a, b may also include network adapters (or switch port cards) or interfaces 922 such as a TCP/IP adapter cards, wireless wi-fi interface cards, or 3G or 4G wireless interface cards or other wired or wireless communication links. The software program 108 (FIG. 1) and the composite service testing program 110a (FIG. 1) in client computer 102 (FIG. 1) and the composite service testing program 110b (FIG. 1) in network server computer 112 (FIG. 1) can be downloaded from an external computer (e.g., server) via a network (for example, the Internet, a local area network or other, wide area network) and respective network adapters or interfaces 922. From the network adapters (or switch port adaptors) or interfaces 922, the software program 108 (FIG. 1) and the composite service testing program 110a (FIG. 1) in client computer 102 (FIG. 1) and the composite service testing program 110b (FIG. 1) in network server computer 112 (FIG. 1) are loaded into the respective hard drive 916. The network may comprise copper wires, optical fibers, wireless transmission, routers, firewalls, switches, gateway computers and/or edge servers.

Each of the sets of external components 904a, b can include a computer display monitor 924, a keyboard 926, and a computer mouse 928. External components 904a, b can also include touch screens, virtual keyboards, touch pads, pointing devices, and other human interface devices. Each of the sets of internal components 902a, b also includes device drivers 930 to interface to computer display monitor 924, keyboard 926, and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
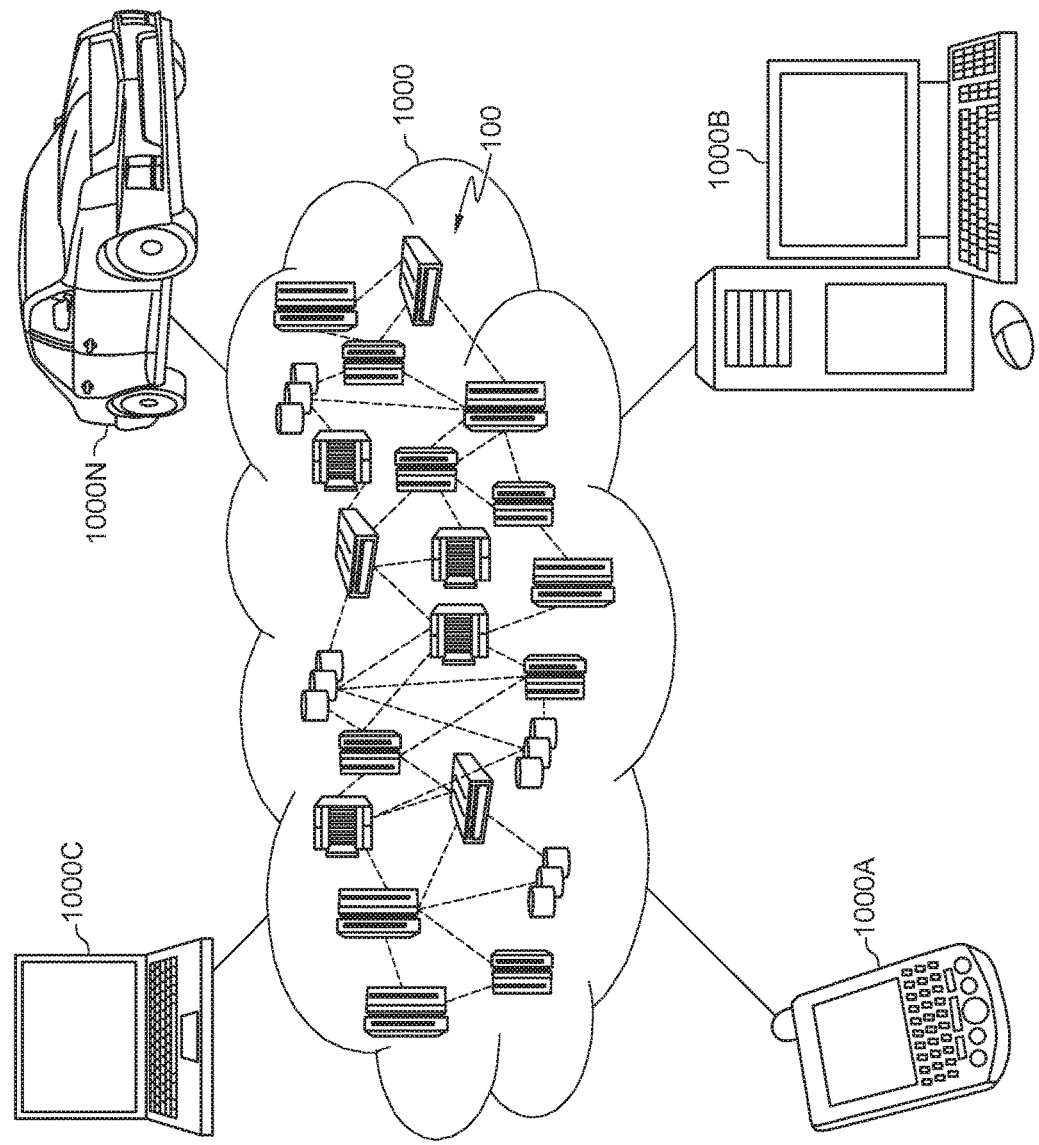
FIG. 6 is a block diagram of an illustrative cloud computing environment including the computer system depicted in FIG. 1, in accordance with an embodiment of the present disclosure.

Referring now to FIG. 6, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 6 are intended to be illustrative only and that computing nodes 100 and cloud computing environment 1000 can communicate with any type of computerized device over any type of network and/or network addressable connection (e.g., using a web browser).

Figure 7:
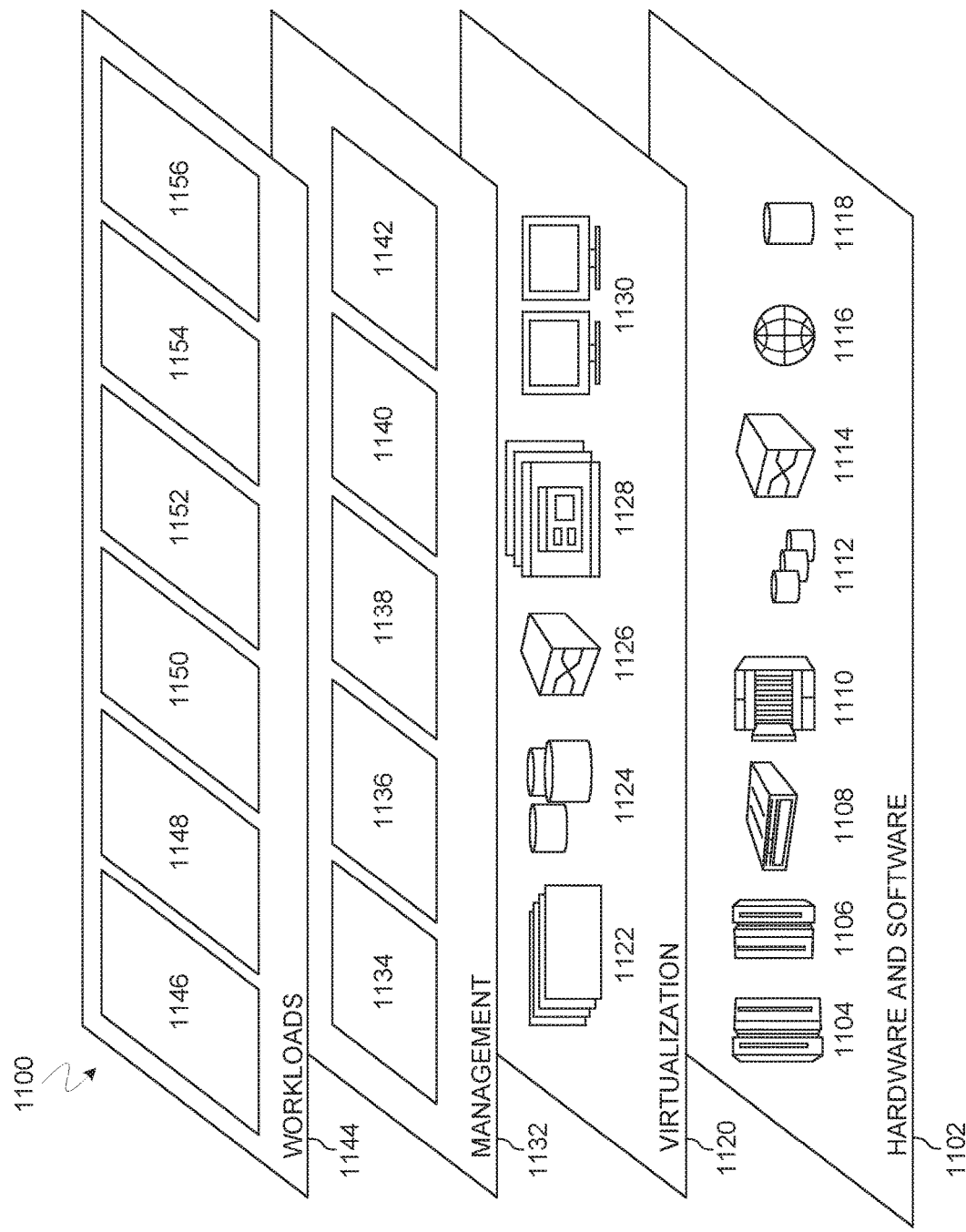
FIG. 7 is a block diagram of functional layers of the illustrative cloud computing environment of FIG. 6, in accordance with an embodiment of the present disclosure.

Referring now to FIG. 7, a set of functional abstraction layers 1100 provided by cloud computing environment 1000 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and composite service testing 1156. A composite service testing program 110a, 110b (FIG. 1) provides a way for a user to record member service interaction within a composite service, generate a global scheduling script, and run the global scheduling script to simulate the composite service for testing.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for testing a composite service, the method comprising:
    installing a first debug probe on a first service;
    installing a second debug probe on a second service;
    executing the composite service, wherein the executed composite service comprises the first service and the second service;
    receiving a first service interaction log and a second service interaction log based on the executed composite service, wherein the first interaction log records a first plurality of input/output (I/O) associated with the first service, and wherein the second interaction log records a second plurality of I/O associated with the second service;
    generating a global scheduling script that simulates the composite service based on the received first service interaction log, the received second interaction log, and a plurality of composition data, wherein generating the global scheduling script that simulates the composite service based on the received first service interaction log, the received second interaction log, and the plurality of composition data, further comprises:
        determining that the plurality of composition data is available for the first service or the second service, wherein the plurality of composition data comprises runtime organizational data; and
        in response to determining that the plurality of composition data is available, retrieving the plurality of composition data; and
    sending the first plurality of I/O to the first debug probe and the second plurality of I/O to the second debug probe based on executing the generated global scheduling script.

2. The method of claim 1, wherein sending the first plurality of I/O to the first debug probe and the second plurality of I/O to the second debug probe based on the generated global scheduling script, further comprises:
    sending, from the first debug probe, the first plurality of I/O to the first service or a first service stub;
    receiving a first reply from the first service or the first service stub;
    sending, from the second debug probe, the second plurality of I/O to the second service or a second service stub; and
    receiving a second reply from the second service or the second service stub.

3. The method of claim 1, wherein sending the first plurality of I/O to the first debug probe is based on determining that at least one first guard event is met, wherein the at least one first guard event is associated with the first service, and wherein sending the second plurality of I/O to the second debug probe is based on determining that at least one second guard event is met, wherein the at least one second guard event is associated with the second service.

4. The method of claim 1, wherein generating the global scheduling script that simulates the composite service is based on the received first service interaction log, the received second interaction log, and the retrieved plurality of composition data.

5. The method of claim 1, further comprising:
sending the generated global scheduling script to a debugging engine, wherein the debugging engine executes the generated global scheduling script.

6. The method of claim 5, wherein sending the first plurality of I/O to the first debug probe and the second plurality of I/O to the second debug probe based on the generated global scheduling script comprises the debugging engine sending a first command to the first debug probe and sending a second command to the second debug probe based on the generated global scheduling script.

7. A computer system for testing a composite service, comprising:
one or more processors, one or more computer-readable memories, one or more non-transitory computer-readable storage media, and program instructions stored on at least one of the one or more non-transitory computer-readable storage media for execution by at least one of the one or more processors via at least one of the one or more memories, wherein the computer system is capable of performing steps comprising:
installing a first debug probe on a first service;
installing a second debug probe on a second service;
executing the composite service, wherein the executed composite service comprises the first service and the second service;
receiving a first service interaction log and a second service interaction log based on the executed composite service, wherein the first interaction log records a first plurality of input/output (I/O) associated with the first service, and wherein the second interaction log records a second plurality of I/O associated with the second service;
generating a global scheduling script that simulates the composite service based on the received first service interaction log, the received second interaction log, and a plurality of composition data, wherein generating the global scheduling script that simulates the composite service based on the received first service interaction log, the received second interaction log, and the plurality of composition data, further comprises:
determining that the plurality of composition data is available for the first service or the second service, wherein the plurality of composition data comprises runtime organizational data; and
in response to determining that the plurality of composition data is available, retrieving the plurality of composition data; and
sending the first plurality of I/O to the first debug probe and the second plurality of I/O to the second debug probe based on executing the generated global scheduling script.

8. The computer system of claim 7, wherein sending the first plurality of I/O to the first debug probe and the second plurality of I/O to the second debug probe based on the generated global scheduling script, further comprises:
sending, from the first debug probe, the first plurality of I/O to the first service or a first service stub;
receiving a first reply from the first service or the first service stub;
sending, from the second debug probe, the second plurality of I/O to the second service or a second service stub; and
receiving a second reply from the second service or the second service stub.

9. The computer system of claim 7, wherein sending the first plurality of I/O to the first debug probe is based on determining that at least one first guard event is met, wherein the at least one first guard event is associated with the first service, and wherein sending the second plurality of I/O to the second debug probe is based on determining that at least one second guard event is met, wherein the at least one second guard event is associated with the second service.

10. The computer system of claim 7, wherein generating the global scheduling script that simulates the composite service is based on the received first service interaction log, the received second interaction log, and the retrieved plurality of composition data.

11. The computer system of claim 7, further comprising:
sending the generated global scheduling script to a debugging engine, wherein the debugging engine executes the generated global scheduling script.

12. The computer system of claim 11, wherein sending the first plurality of I/O to the first debug probe and the second plurality of I/O to the second debug probe based on the generated global scheduling script comprises the debugging engine sending a first command to the first debug probe and sending a second command to the second debug probe based on the generated global scheduling script.

13. A computer program product for testing a composite service, comprising:
one or more non-transitory computer-readable storage media and program instructions stored on at least one of the one or more non-transitory computer-readable storage media, the program instructions executable by a processor, the program instructions comprising:
program instructions to install a first debug probe on a first service;
program instructions to install a second debug probe on a second service;
program instructions to execute the composite service, wherein the executed composite service comprises the first service and the second service;
program instructions to receive a first service interaction log and a second service interaction log based on the executed composite service, wherein the first interaction log records a first plurality of input/output (I/O) associated with the first service, and wherein the second interaction log records a second plurality of I/O associated with the second service;
program instructions to generate a global scheduling script that simulates the composite service based on the received first service interaction log, the received second interaction log, and a plurality of composition data, wherein generating the global scheduling script that simulates the composite service based on the received first service interaction log, the received second interaction log, and the plurality of composition data, further comprises:
program instructions to determine that the plurality of composition data is available for the first service or the second service, wherein the plurality of composition data comprises runtime organizational data; and in response to determining that the plurality of composition data is available, program instructions to retrieve the plurality of composition data; and program instructions to send the first plurality of I/O to the first debug probe and the second plurality of I/O to the second debug probe based on executing the generated global scheduling script.

14. The computer program product of claim 13, wherein sending the first plurality of I/O to the first debug probe and the second plurality of I/O to the second debug probe based on the generated global scheduling script, further comprises:

program instructions to send, from the first debug probe, the first plurality of I/O to the first service or a first service stub;

program instructions to receive a first reply from the first service or the first service stub;

program instructions to send, from the second debug probe, the second plurality of I/O to the second service or a second service stub; and program instructions to receive a second reply from the second service or the second service stub.

15. The computer program product of claim 13, wherein sending the first plurality of I/O to the first debug probe is based on determining that at least one first guard event is met, wherein the at least one first guard event is associated with the first service, and wherein sending the second plurality of I/O to the second debug probe is based on determining that at least one second guard event is met, wherein the at least one second guard event is associated with the second service.

16. The computer program product of claim 13, wherein generating the global scheduling script that simulates the composite service is based on the received first service interaction log, the received second interaction log, and the retrieved plurality of composition data.

17. The computer program product of claim 13, further comprising:

program instructions to send the generated global scheduling script to a debugging engine, wherein the debugging engine executes the generated global scheduling script.

* * * * *